June 27, 1967 R. F. KNIGHT ET AL 3,327,363
FASTENER AND RETAINER ASSEMBLY
Filed May 3, 1965

INVENTORS
ROBERT F. KNIGHT
HOWARD J. SMITH
BY
Daniel H. Kane
ATTORNEY

3,327,363
FASTENER AND RETAINER ASSEMBLY

Robert F. Knight, Streatham, London, and Howard J. Smith, Farnham, Surrey, England, assignors to Dzus Fastener Co. Inc., West Islip, N.Y., a corporation of New York
Filed May 3, 1965, Ser. No. 452,655
1 Claim. (Cl. 24—221)

This invention relates to an improved fastener and retainer assembly and more particularly to an improved retaining collar for retaining a fastener stud in position.

Fastening devices frequently consist of a stud member which is releasably engageable with a receptacle member or spring. The stud member is extended through an opening in a part or support which it is desired to secure in place and the stud member is frequently retained in captive relationship with its support as by means of a grommet or a retaining ring or washer. Assembling the grommet, retaining ring or washer with the stud frequently presents difficulties and disadvantages. Thus, special tools are generally required; the operation is time consuming; and, operators having special skill or training must be employed.

It is an object of the present invention to overcome these difficulties and disadvantages and to provide an improved fastener and retainer assembly and more particularly an improved retaining collar for use with a fastening stud which is simple to install; which does not require the use of special tools or of specially trained operators; and, which will give satisfactory service over a long period of time to retain the fastener stud in captive relationship.

Our invention contemplates the provision of an improved retaining collar for use with a fastener stud having a head and a shank with a neck of smaller diameter than the shank extending between the head and shank. The collar comprises an annular disc of resilient plastic material with a thinner dished portion surrounding its central opening, and the dished portion is sufficiently flexible and resilient to enable the collar to be forced over the shank and onto the neck of a stud of suitable diameter without stressing the plastic material beyond its elastic limit.

Figure 1:
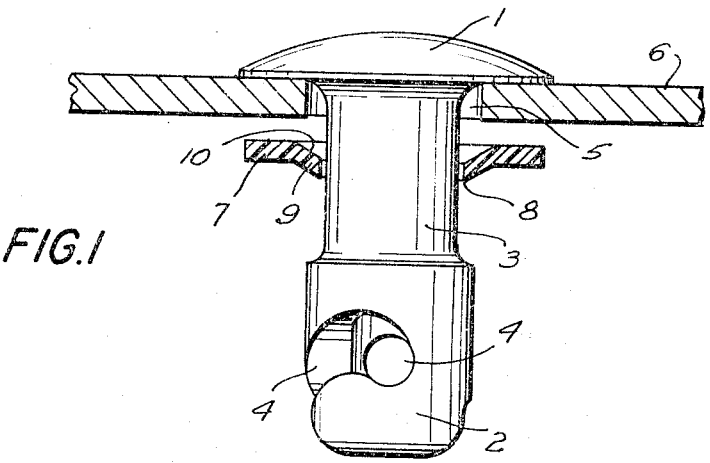
FIG. 1 is a side view showing a fastener stud in full lines and a supporting panel and a retaining collar embodying our invention in section.
Figure 2:
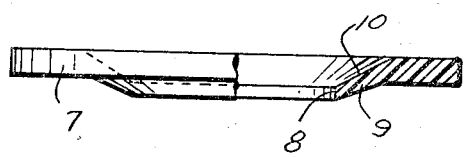
FIG. 2 is a side elevational view of a retaining collar prior to assembly with the fastener stud; and, FIG. 3 is an elevational view of the lower portion of the fastener stud showing the retaining collar being assembled over the shank portion thereof.
Figure 3:
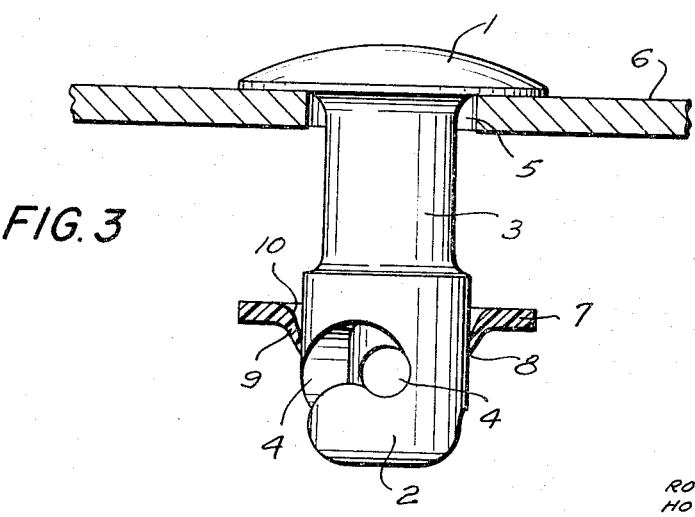

A typical fastener stud with which our improved retaining collar may be used is shown in FIGS. 1 and 3 and comprises a head portion 1, a shank portion 2 beneath the head and of smaller diameter than the head portion, and a neck portion 3 of smaller diameter than the shank portion and extending between the head and the shank portions.

The illustrated fastener stud is of the spiral cam type and the shank portion 2 is of tubular construction and has a pair of oppositely disposed spiral cam slots 4 extending upwardly from the lower end thereof and terminating beyond a shoulder portion. Fasteners of this type are shown in prior United States Patents No. 1,955,740 and No. 2,506,953.

The fastener stud is illustrated as retained in captive relationship with the supporting panel 6 by means of our improved retaining collar 7. The supporting panel 6 has an opening 5 through which the shank of the stud has been inserted so that the opening is disposed around the neck portion. In this connection, the opening 5 is large enough to accommodate the shank portion 2 of the fastener stud but it is smaller than the head portion 1.

The retaining collar 7 is in the form of an annular disc with a central opening 8 and having a concavo-convex centrally dished portion 10 which tapers in a radially inward direction as shown at 9.

The retaining collar is made from a suitable resilient plastic material which is preferably of the type which is unaffected by water and ordinary chemicals and solvents with which it may come in contact. For this purpose we prefer to employ a relatively high density polyethylene. However, other materials having similar characteristics, such as polypropylene or polyvinyl resins, may also be employed.

We claim:

An improved fastener and retainer assembly comprising a fastener stud having a head and a shank with a neck of smaller diameter than the shank and head extending between the head and shank, a support for the fastener stud having an opening larger than the shank portion and smaller than the head portion with the neck portion of the fastener stud being disposed in the opening, and with the head and shank being disposed on respectively opposite sides of the support, and a retaining collar for retaining the fastener stud in assembled relationship with the support and comprising an annular disc of larger outside diameter than the opening in the support and having a central opening smaller than the shank portion and being made of a resilient plastic material and having a relatively flat annular portion adjacent its periphery and a thinner concavo-convex dished portion surrounding its central opening, said collar being disposed around the neck portion of the fastener stud on the opposite side of the support from the head, with the thinner dished portion in frictional engagement with the neck portion and said thinner dished portion being sufficiently flexible and resilient to enable the collar to be forced over the shank and onto the neck portion without stressing the plastic material beyond its elastic limit, the thickness of said retaining collar being substantially less than the distance between the under surface of the support and the lower end of the neck of the fastener stud.

References Cited

UNITED STATES PATENTS

| 2,200,702 | 5/1940 | Oddie | 24—221 |
| 2,729,080 | 1/1956 | Bennett | 277—205 X |
| 2,761,347 | 9/1956 | McKee | 85—1 |
| 2,983,534 | 5/1961 | Heller et al. | 85—1 X |

FOREIGN PATENTS

| 947,816 | 1/1964 | Great Britain. |

WILLIAM FELDMAN, *Primary Examiner.*

E. SIMONSEN, *Assistant Examiner.*